United States Patent
Michael et al.

(12)

(10) Patent No.: US 6,421,458 B2
(45) Date of Patent: *Jul. 16, 2002

(54) AUTOMATED INSPECTION OF OBJECTS UNDERGOING GENERAL AFFINE TRANSFORMATION

(75) Inventors: David J. Michael, Framingham; Igor Reyzin, Brookline, both of MA (US)

(73) Assignee: Cognex Corporation, Natick, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

(21) Appl. No.: 09/141,932

(22) Filed: Aug. 28, 1998

(51) Int. Cl.$^7$ ............................................... G06K 9/32
(52) U.S. Cl. .................................................. 382/151
(58) Field of Search ........................ 382/151, 147–149, 382/216, 289, 294, 295, 296, 298; 348/87, 126; 702/40, 150, 151, 159; 250/559.3, 559.34, 559.37, 559.39, 559.46; 356/375, 237.4, 237.5

(56) References Cited

U.S. PATENT DOCUMENTS

| | | | | |
|---|---|---|---|---|
| 4,805,123 A | * | 2/1989 | Specht et al. | 364/559 |
| 4,849,679 A | * | 7/1989 | Taft et al. | 318/577 |
| 5,537,669 A | | 7/1996 | Evans et al. | 382/141 |
| 5,640,200 A | * | 6/1997 | Michael | 348/87 |
| 5,793,901 A | * | 8/1998 | Matsutake et al. | 382/294 |

OTHER PUBLICATIONS

Bracewell, Ronald N., Two–Dimensional Imaging, Prentice Hall, NJ, 1995, pp. 50–67.

* cited by examiner

*Primary Examiner*—Leo Boudreau
*Assistant Examiner*—Brian P. Werner
(74) *Attorney, Agent, or Firm*—Brian Michaelis

(57) ABSTRACT

During statistical training and automated inspection of objects by a machine vision system, a General Affine Transform is advantageously employed to improve system performance. During statistical training, the affine poses of a plurality of training images are determined with respect to an alignment model image. Following filtering to remove high frequency content, the training images and their corresponding affine poses are applied to an affine transformation. The resulting transformed images are accumulated to compute template and threshold images to be used for run-time inspection. During run-time inspection, the affine pose of the run-time image relative to the alignment model image is determined. Following filtering of the run-time image, the run-time image is affine transformed by its affine pose. The resulting transform image is compared with the template and threshold images computed during statistical training to determine object status. In this manner, automated training and inspection is relatively less demanding on system storage, and results in an improvement in system speed and accuracy.

38 Claims, 2 Drawing Sheets

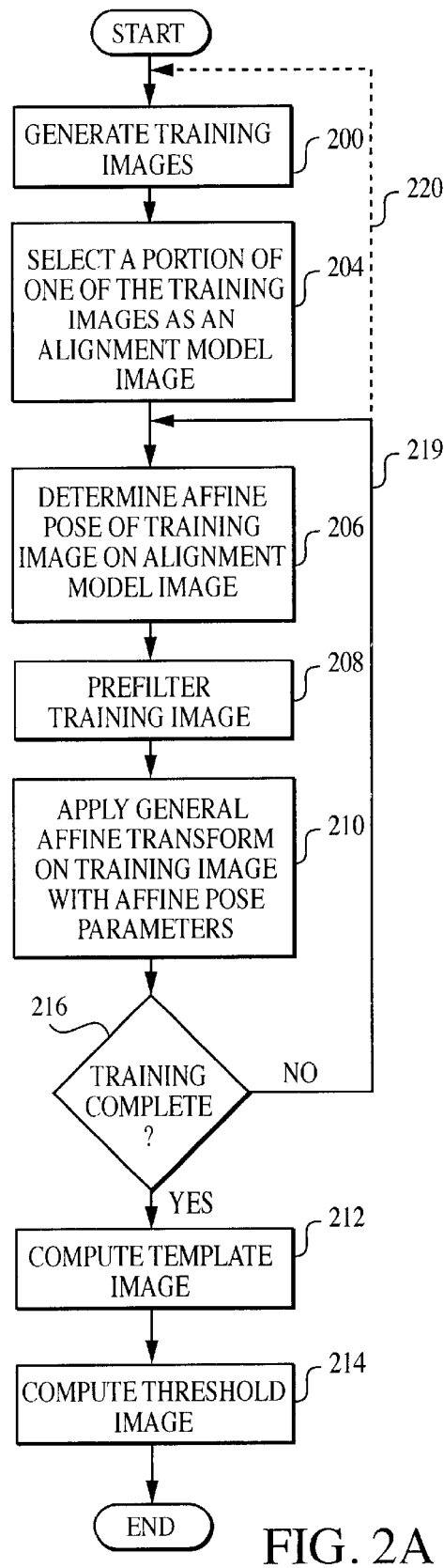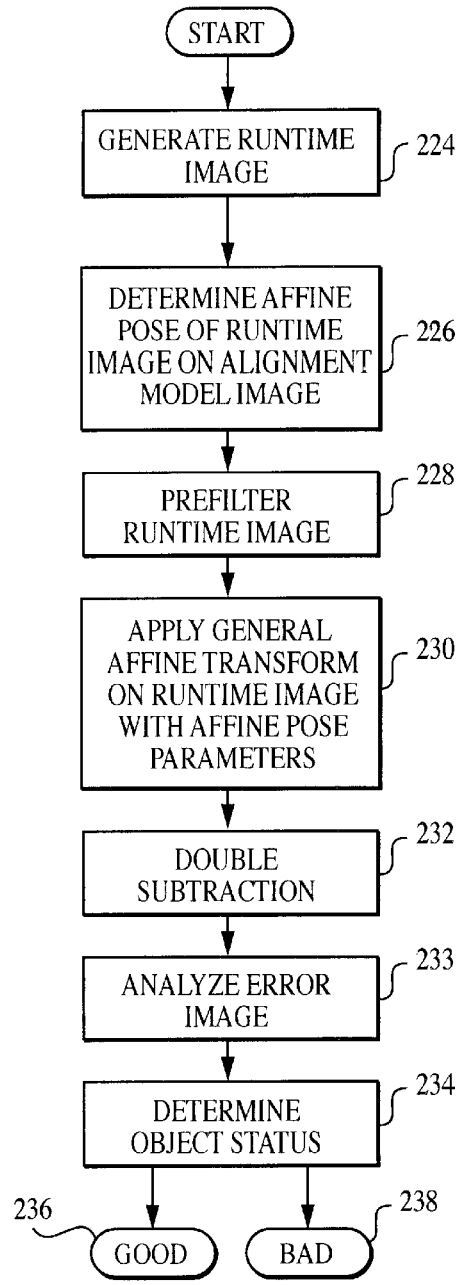
FIG. 2A
FIG. 2B

AUTOMATED INSPECTION OF OBJECTS UNDERGOING GENERAL AFFINE TRANSFORMATION

BACKGROUND OF THE INVENTION

Machine or "artificial" vision systems are commonly employed for the automated inspection of objects. In manufacturing applications for example, machine vision systems distinguish those objects manufactured within acceptable tolerance levels (i.e. "good parts"), from objects manufactured outside acceptable tolerance levels ("bad parts").

Contemporary automated inspection techniques include generally the steps of statistical training and run-time inspection. During statistical training, a number of acceptable objects are presented that can be at a range of positions and orientations relative to the vision system. The system interrogates the objects and formulates statistical images of the acceptable objects. In current systems, the statistical images comprise a template, or average, image, and an acceptable statistical variation of the average image, referred to as threshold image, which is often computed from a variance or standard deviation image.

The information learned about the object during statistical training is, in turn, applied to the run-time inspection of parts of unknown quality. The run-time images obtained during run-time inspection are compared to the template image and the differences are analyzed. Where the analyzed differences exceed a known, predetermined value, the part is considered a defect. Otherwise, the part is acceptable.

Both statistical training and run-time inspection processes include the steps of registration and computation. During registration, an alignment of the object image or "target" relative to an alignment model origin is performed. The output of the alignment process is the spatial coordinates of a predetermined origin of the target relative to the alignment model origin. In contemporary systems, the spatial coordinates comprise a real number including a whole pixel portion and a sub-pixel portion. Translation of the whole pixel portion is relatively straightforward. A well-known technique referred to as "re-windowing" is used to perform this translation.

Computation of the sub-pixel portion, on the other hand, is quite complicated. Conventional training processes employ a technique called sub-pixel binning in which each pixel in the image is quantized into a number of sub-pixels. The goal of this process is to build a template image and a threshold image for each bin, thereby improving the resolution of statistical training. During run-time, the run-time image is compared to the template image. The origin of the run-time image is analyzed during an alignment procedure, and the appropriate pixel bin determined. The run-time image and the binned template image (average) are then compared on a pixel-by-pixel basis, depending on the selected bin.

Computations during training and run-time involving the sub-pixel binned images require a significant amount of storage space. During training, each sub-pixel bin requires at least two accumulators—one for the template image and one for the threshold image. As more sub-pixel bins are added to improve system resolution and therefore lower inspection errors due to sub-pixel misregistration, the system is further burdened by the need for additional storage and image accumulators. Furthermore, the quality of the statistics of each sub-pixel bin is a direct function of the amount and quality of training data stored in the bin. If a bin does not contain much training data, then statistics in that bin are relatively poor and therefore inspection errors are more likely to occur.

SUMMARY OF THE INVENTION

The present invention is directed to a method and system for statistical training of a machine vision system on an object, and is further directed to a method and system for automated inspection of objects using the results of such statistical training. The invention addresses the aforementioned limitations of conventional techniques, and provides an inspection. process which is relatively less demanding on system storage, and improves system speed and accuracy.

During statistical training and automated inspection of objects by the machine vision system of the present invention, a General Affine Transform is advantageously employed to improve system performance. During statistical training, the affine poses of a plurality of training images are determined with respect to an alignment model image. Following filtering to remove selected spatial frequency content, the training images and their corresponding affine poses are applied to an affine transformation. The resulting transformed images are accumulated to compute template and threshold images to be used for run-time inspection.

During run-time inspection, the affine pose of the run-time image relative to the alignment model image is determined. Following filtering of the run-time image, the run-time image is affine transformed by its affine pose. The resulting transform image is compared to the template and threshold images computed during statistical training to determine object status. In this manner, automated training and inspection is relatively less demanding on system storage, and results in an improvement in system speed and accuracy.

In one embodiment, the present invention is directed to a method for statistical training of an artificial vision system on an object. A plurality of training images are generated by iteratively imaging one or a number of training objects. The affine pose of each training image with respect to an alignment model image is next determined. Each training image is prefiltered to generate filtered images. Each filtered image is transformed with its corresponding affine pose to generate a plurality of transformed images. A template image and threshold image of the object are then computed from the plurality of transformed images.

In another embodiment, the present invention is directed to a method for automated inspection of an object. The object is first imaged to generate a run-time image. The affine pose of the run-time image with respect to an alignment model image is then determined. The run-time image is prefiltered to generate a filtered image. The filtered image is transformed with its affine pose to generate a transformed image. The transformed image is mean-corrected by the template image, and the mean-corrected image is compared with a threshold image to produce an error image. The error image is analyzed to determine object status.

The alignment model image may be selected as one of or a part of one of the training images collected during statistical training. A geometric model of the object may also be employed as an alignment model image.

In a preferred embodiment, the template image comprises an average image of the transformed training images, while the threshold image comprises an allowable variation of the average image, for example, a linear function of a standard deviation image.

The affine pose is preferably computed by determining the General Affine Transform parameters which accurately map the training and run-time images to the alignment model image.

During prefiltering, the training and run-time images are convolved with a kernel suitable for eliminating high spatial frequency elements from the image that match the worst-case spatial frequency effects of the affine interpolator. In one embodiment, the kernel comprises an impulse function.

The process of transforming the filtered training and run-time images preferably comprises applying the image and the parameters of the corresponding affine pose to a General Affine Transform, such that the transformed training images are properly aligned for computing the template and threshold images, and such that the transformed run-time image is properly aligned with the template and threshold images for comparison thereof. The comparison of the transformed run-time image with the template image is preferably performed by a process referred to as double subtraction.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a flow diagram representing the steps for statistical training in accordance with the present invention.

FIG. 2B is a flow diagram representing the steps for automated object inspection in accordance with the present invention.

DETAILED DESCRIPTION OF PREFERRED EMBODIMENTS

The present invention applies to both statistical training and run-time inspection in artificial vision systems, taking advantage of the availability of accurate alignment tools capable of quickly generating the affine pose of an object image relative to an alignment model of the object. The affine pose is, in turn, used to generate a transformed image. During training, the transformed image is used to compute a template image and threshold image of the object. During run-time inspection, the transformed image is compared to the computed template and threshold images to determine object status, i.e., whether the object is within tolerances, or alternatively, whether the object is defective.

In this manner, the present invention employs the General Affine Transformation to exactly transform coordinate systems such that during training, the transformed training images align exactly to allow for the computation of a single template image and single threshold image to define the object, and such that during inspection, the template and threshold images and transformed run-time image align exactly for comparison by double subtraction. During training, the template and threshold images can be accumulated and computed using a single pair of accumulator images, as compared to the binning technique of conventional procedures requiring multiple pairs of accumulator images. Furthermore, in the present invention, all training data is represented in the singular template and threshold images, as compared to binning, whereby training data may be unevenly scattered throughout the binned images. By virtue of precise alignment as a result of the affine transform, system accuracy and performance is greatly improved over conventional systems.

During statistical training and run-time inspection, the position and orientation of the object being interrogated may vary along many degrees of freedom. Combinations of these degrees of freedom include the well-known parameters scale, rotation, skew, and translation. Each of these degrees of freedom are represented in the parameters of the well-known General Affine Transformation, which allows for precise mapping between source and destination images. The General Affine Transformation is well known and understood in the art, and is described in *Two Dimensional Imaging*, Ronald N. Bracewell, Prentice Hall, N.J., 1995, pages 50–67, incorporated herein by reference.

The method and apparatus of the present invention will now be described in further detail with reference to the attached figures. The description of the statistical training system of FIG. 1A refers to the statistical training process steps of FIG. 2A. Likewise, the description of the run-time inspection system of FIG. 1B refers to the run-time inspection process steps of FIG. 2B.

Figure 1A:
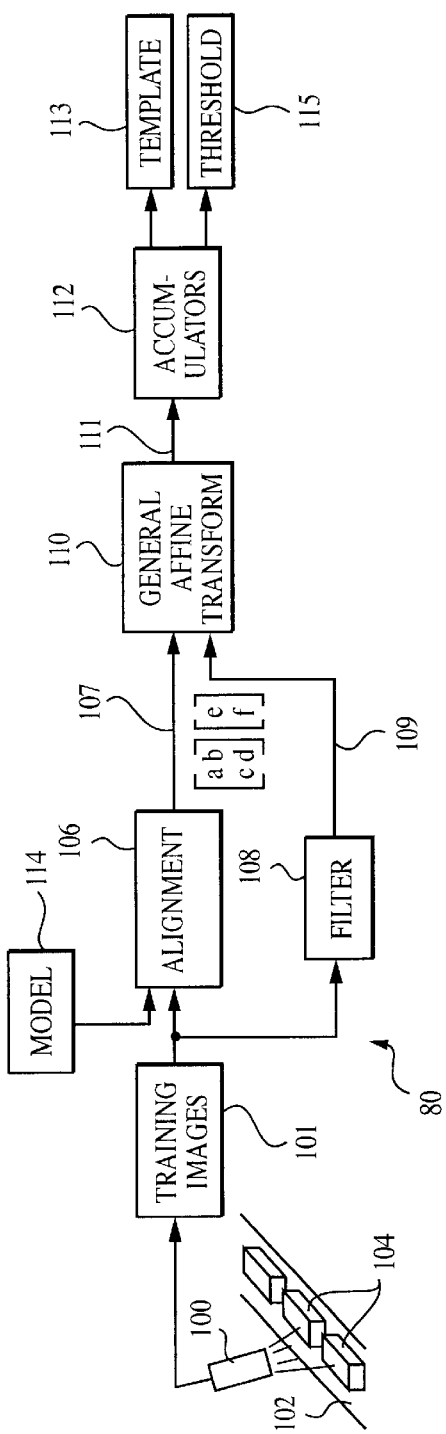
FIG. 1A is a block diagram of the primary components of a statistical training system in accordance with the present invention.

FIG. 1A is a block diagram of the primary components of a preferred embodiment of a statistical training system in accordance with the present invention. The statistical training system includes an imaging system 100 and processing system 80.

In step 200 (FIG. 2A), a series of training images are captured of an object or plurality of objects. For example a plurality of objects 104 may be presented to the imaging system 100 by means of conveyor 102. Alternatively, the same object may be presented at a range of positions and orientations, relative to the imaging system 100. In a preferred embodiment, the training objects 104 comprise objects known to be representative samples so as to produce the most accurate statistics. Ideally, for each training image, the training object 104 lies in nearly the same position and orientation relative to the imaging system 100, allowing for increased resolution. In general, the greater the number of training images, the more robust and accurate are the results.

In step 204 (FIG. 2A), an alignment model image for the object is determined. In one embodiment, the alignment model image 114 is selected from one of or part of the captured training images, for example the first collected training image. Alternatively, the alignment model image 114 may comprise a synthetic geometric model of the object 104. The alignment model preferably includes readily distinguishable features of the object to be employed as a reference for alignment, for example corners, faces, or collections of corners and faces of the object. The alignment model image may comprise the entire training image itself, or alternatively may comprise a portion of the training image containing interesting, or otherwise distinguishable, features of the object.

The selected alignment model image 114 and each training image 101 are presented to an alignment system 106 for determining the affine pose 107 of each training image with respect to the alignment model image (step 206 of FIG. 2A). Alignment tools, for example PATMAX™, commercially available from Cognex Corporation, Natick, Mass. are readily available to perform the affine pose computation.

The affine pose 107 comprises a set of parameters which describe how the training image can be transformed mathematically so as to align the training image with the alignment model image. Assuming a two-dimensional image of a three-dimensional object, the affine parameters apply to six degrees of freedom, to compensate for image scale, shear, rotation, skew, and translation. The parameters are in the form of a 2×2 matrix containing scale, rotation, skew and shear parameters, and a two-dimensional vector containing displacement, or translation, parameters. Note, however, that the present invention is not limited to a system where the object is undergoing all six degrees of freedom. The invention applies equally well to inspecting objects undergoing a subset of the degrees of freedom, for example translation only, or translation and rotation. In which case, the alignment tool provides only those parameters necessary for determining the affine pose of the object. For example the CNLSearch™ tool commercially available from Cognex Corporation provides translation only.

Each training image 101 is further applied to a prefilter 108 for the purpose of eliminating errors to be introduced by the affine transformation (step 208 of FIG. 2A). The affine transform can behave as a low pass filter, the filtering effect of which is dependent, for example, on the type of interpolation used and on the object rotation angle. The variance in filtering effect manifests itself especially in high-frequency elements of the image. The purpose of the prefilter is to substantially eliminate such high-frequency effects from the training images before the affine transform is performed, so as to reduce the relative dependence of the affine transform results. The prefilter may comprise a Gaussian or averaging filter, for example, in the form of a convolution kernel to be applied to the training image on a pixel-by-pixel basis, and is preferably matched to the worst-case effects of the interpolator used in the affine transform. The resultant filtered training images 101 may be slightly blurred as a result of prefiltering, but not so much as to adversely affect system performance. If the worst-case effects of the affine interpolator are negligible, the convolution kernel may comprise, for example, an impulse function.

In step 210 (FIG. 2A), each filtered training image 109 and its corresponding affine pose parameters 107 are applied to the General Affine Transform 110 to generate transformed training images 111. The affine transform 110 assures that each of the transformed training images 111 substantially align to allow for later computation of the template and threshold images defining the object. The affine transform is well-known in the art, and systems and software for computing the affine transform are available commercially. A preferred affine transform computation technique employs the teachings of U.S. patent application Ser. No. 09/027,432, by Igor Reyzin, filed Feb. 20, 1998, assigned to Cognex Corporation, the contents of which are incorporated herein by reference in their entirety. The transformed training images are preferably stored in a pair of accumulators 112.

Following transformation, a template image 113 is computed in step 212 (FIG. 2A). The template image preferably comprises an average image of the transformed training images 111 computed from the first accumulated image 112. A threshold image 115 is also computed as a linear function of the standard deviation of the average image which, in turn, is computed from the first and second accumulated images 112. Alternatively, the threshold image may be computed by a linear function of the variance of the average image, or by a linear function of the magnitude of an operator, for example a Sobel operator, applied to the training image. If a Sobel operator is used, then the second accumulator is no longer necessary. The combined template and threshold images 113, 115 together define the object and acceptable variations thereof They are later used during run-time inspection for comparison with a run-time image of the object to determine object status, i.e. determine whether the object is acceptable, or is a reject. Software for computing the template and threshold images is available commercially, for example the GTC™ product available from Cognex Corporation, Natick, Mass.

In step 216 (FIG. 2A), a determination is made as to whether training is complete. If so, the system is prepared for run-time inspection. If not, additional training images may be captured 220 (FIG. 2A), or further processing of previously-captured images may be performed 219 (FIG. 2B). The invention is inherently flexible with regard to the ordering of training steps. For example, all training images may be initially captured and then applied to the training system 80 as a group. Alternatively, each training image may be captured and individually applied to the system 80, the results of each iteration being accumulated in accumulators 112.

At the completion of training, a template image 113 and threshold image 115 are available for use during run-time inspection.

Figure 1B:
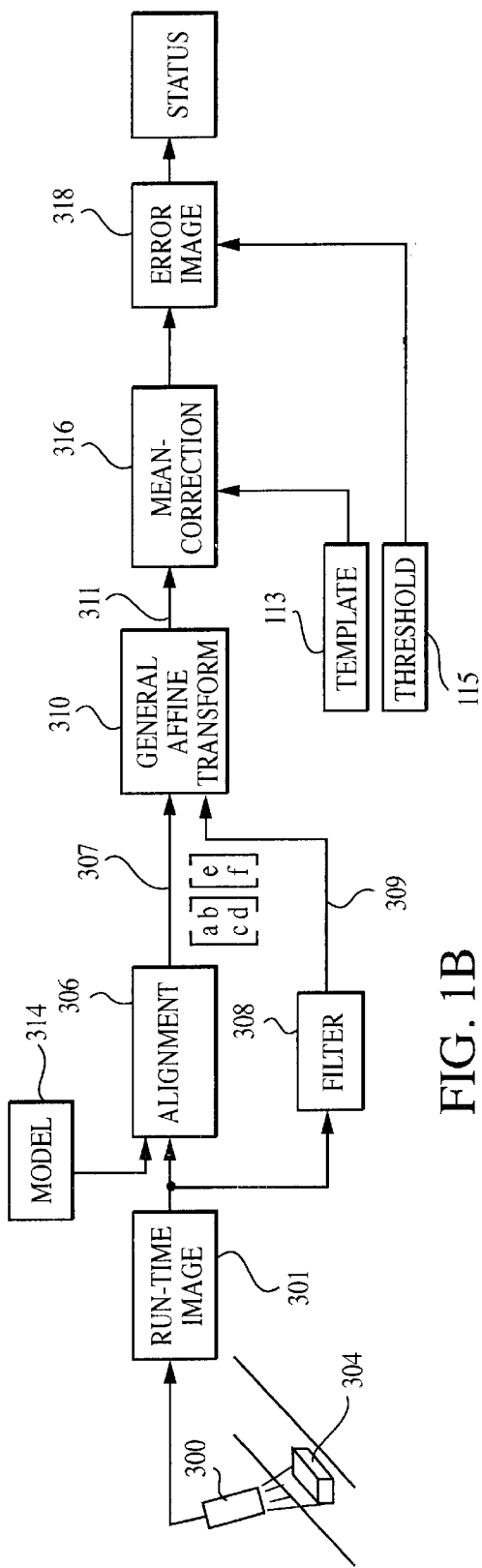
FIG. 1B is a block diagram of the primary components of a real-time inspection system in accordance with the present invention.

With reference to FIGS. 1B and 2B, the run-time inspection system comprises an imaging system 300 and a processing system 90. At the outset of run-time inspection, an object 304 of unknown status is imaged by imaging system 300 to generate a run-time image 301. As described above, the run-time image 301 and alignment model image 314 are presented to alignment system 306 to determine the affine pose 307 of the run-time image 301 with respect to the alignment model image 314 (step 226 of FIG. 2B). The run-time image 301 is likewise prefiltered (step 228 of FIG. 2B) by filter 308 to generate a filtered image 309.

In step 230 (FIG. 2B), the affine pose 307 and filtered run-time image 309 are applied to a General Affine Transform 310 to generate a transformed image 311 which aligns substantially with the template and threshold images 113, 115 computed during statistical training, as described above.

The transformed image is next processed in a technique referred to as "double subtraction" to produce an error image (step 232 of FIG. 2B). The first subtraction of the double subtraction provides a mean-corrected image 316, which can be represented by the following relationship:

$$\text{Mean-Corrected Image} = |I - \text{Avg}|$$

where I represents the transformed run-time image 311, and Avg represents the template image 113, for example the average image. A mean-corrected image may be generated using alternative techniques, for example temporal filtering.

The second subtraction of the double subtraction (step 232 of FIG. 2B) provides an error image 318, which can be represented by the following relationship:

$$\text{Error Image} = \text{Mean Corrected Image} - \text{Threshold Image}$$

where Threshold represents the threshold image 115, for example a linear function of the standard deviation image.

The error image can be further analyzed (step 233 of FIG. 2B) according to a number of techniques to determine object status. For example, the intensity and number of pixels can be counted and recorded, and a histogram computed, to determine the extent of the error. A morphological operator, for example an erosion operator, can be employed to eliminate isolated error pixels, followed by a counting of the error pixels. Alternatively, a connectivity analysis tool, or "blob" tool, may be employed. In this technique, connected regions of the error image are labeled, and statistics on the area, position, and orientation of the labeled regions are computed and the statistics can be used to classify the object as good or bad.

Following analysis of the error image, an object status is determined (step 234 of FIG. 2B) to categorize the inspected object as a defective part (step 238), or an acceptable part (step 236).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for automated inspection of an object comprising:
    imaging an object to generate a run-time image;
    determining the affine pose of the run-time image with respect to an alignment model image, created from a plurality of training samples used to form a template, the alignment model image representing the object at a single predetermined orientation wherein said affine pose comprises parameters defining said object's orientation with at least four degrees of freedom;
    prefiltering the run-time image using a filter that reduces errors introduced by a subsequent affine transformation to generate a filtered image;
    transforming the filtered image with the affine pose to generate a transformed image;
    mean-correcting the transformed image with said template image to provide a mean-corrected image;
    comparing the mean-corrected image with a threshold image to produce an error image; and
    analyzing the error image to determine object status.

2. The method of claim 1 further comprising determining a template and threshold image for the object.

3. The method of claim 2 wherein the template image comprises an average image.

4. The method of claim 2 wherein the threshold image comprises a function of a standard deviation image.

5. The method of claim 1 wherein determining the affine pose comprises determining the affine transform parameters which map the run-time image to the alignment model image.

6. The method of claim 1 wherein prefiltering comprises convolving the run-time image with a kernel adapted to eliminate high-frequency elements from the image.

7. The method of claim 6 wherein the kernel comprises an impulse function.

8. The method of claim 1 wherein transforming comprises applying the filtered run-time image to a General Affine Transform, the parameters of which are determined by the affine pose.

9. The method of claim 1 wherein mean correcting and comparing comprise the technique of double subtraction of the run-time image on a pixel-by-pixel basis, the output of which is an error image represented by:

Mean-Corrected Image=|I−Avg| and

Error Image=Mean Corrected Image−Threshold Image where I represents the transformed run-time image, Avg represents the template image, and Threshold represents the threshold image.

10. The method of claim 1 wherein the template image comprises an average image, and wherein the threshold image comprises a linear transformation of the standard deviation of the average image.

11. The method of claim 1 wherein the template and threshold images are determined by:
    iteratively imaging training objects to generate a plurality of training images;
    determining the affine pose of each training image with respect to an alignment model image;
    prefiltering each training image to generate filtered training images;
    transforming each of the filtered training images with the corresponding affine pose to generate a plurality of transformed training images; and
    computing a template image and threshold image of the object from the plurality of transformed training images.

12. The method of claim 11 further comprising generating an alignment model image from a geometric model of the object.

13. The method of claim 11 further comprising generating an alignment model image by selecting a portion of one of the training images as an alignment model image.

14. The method of claim 11 wherein determining the training image affine pose comprises determining the affine transform parameters which map the training image to the alignment model image.

15. In an artificial vision system, a method for statistical training of the system on an object comprising:
    iteratively imaging an object to generate a plurality of training images;
    determining the affine pose of each training image with respect to an alignment model image selected from one of the plurality of training samples, wherein said affine pose comprises parameters defining said object's orientation with at least four degrees of freedom;
    prefiltering each training image using a filter that reduces errors introduced by a subsequent affine transformation to generate filtered images;
    transforming each of the filtered images with the corresponding affine pose to generate a plurality of transformed images;
    computing a template image and threshold image of the object from the plurality of transformed images; and
    comparing the alignment model with a run-time image of the object to align the run-time image with the template.

16. The method of claim 15 further comprising generating an alignment model image from a geometric model of the object.

17. The method of claim 15 further comprising generating an alignment model image by selecting a portion of one of the training images as an alignment model image.

18. The method of claim 15 wherein determining the affine pose comprises determining the affine transform parameters which map the training image to the alignment model image.

19. The method of claim 15 wherein prefiltering comprises convolving the training images with a kernel adapted to eliminate high frequency elements from the image.

20. The method of claim 19 wherein the kernel comprises an impulse function.

21. The method of claim 15 wherein the template image and threshold image are each computed in a single accumulator.

22. The method of claim 15 wherein the template image comprises an average image.

23. The method of claim 15 wherein the threshold image comprises a linear function of a standard deviation image.

24. The method of claim 15 wherein transforming comprises applying the filtered run-time image to a General Affine Transform, the parameters of which are determined by the affine pose.

25. The method of claim 15 further comprising:
during run-time, imaging a run-time object to generate a run-time image;
determining the affine pose of the run-time image with respect to the alignment model image;
prefiltering the run-time image to generate a filtered run-time image;
transforming the filtered run-time image with the affine pose of the run-time image to generate a transformed run-time image;
mean-correcting the transformed run-time image with the template image to provide a mean-corrected image;
comparing the mean-corrected image with the threshold image to produce an error image; and
analyzing the error image to determine object status.

26. A system for automated inspection of an object comprising:
an imaging system for imaging an object to generate a run-time image;
an alignment unit for determining the affine pose of the run-time image with respect to an alignment model image created from a plurality of training samples used to form a template, the alignment model image representing the object at a single predetermined orientation wherein said affine pose comprises parameters defining the object's orientation with at least four degrees of freedom;
a filter for prefiltering the run-time image to generate a filtered image using a filter that reduces errors introduced by subsequent affine transformation;
an affine transform for transforming the filtered image with the affine pose to generate a transformed image;
a mean-corrector for correcting the transformed image with said template image to provide a mean-corrected image;
a comparator for comparing the mean-corrected image with the a threshold image to produce an error image;
an analyzer for analyzing the error image to determine object status; and
means for determining a template and threshold image for the object.

27. The system of claim 26 wherein the affine pose comprises affine transform parameters which map the run-time image to the alignment model image.

28. The system of claim 26 wherein the mean-correcting and comparator perform double subtraction of the run-time image on a pixel-by-pixel basis, the output of which is an error image represented by:

Mean-Corrected Image=|I−Avg| and

Error Image=Mean Corrected Image−Threshold Image where I represents the transformed run-time image, Avg represents the template image, and Threshold represents the threshold image.

29. The system of claim 26 wherein the template image comprises an average image, and wherein the threshold image comprises a linear transformation of the standard deviation of the average image.

30. The system of claim 26 further comprising a system for determining the template and threshold images comprising:
an imaging system for iteratively imaging training objects to generate a plurality of training images;
an alignment unit for determining the affine pose of each training image with respect to an alignment model image;
a training filter for prefiltering each training image to generate filtered training images;
a training affine transform for transforming each of the filtered training images with the corresponding affine pose to generate a plurality of transformed training images; and
means for computing a template image and threshold image of the object from the plurality of transformed training images.

31. The system of claim 30 wherein the alignment model image is generated from a geometric model of the object.

32. The system of claim 30 wherein the alignment model image is generated by selecting a portion of one of the training images as an alignment model image.

33. The system of claim 30 wherein the training image affine pose comprises the affine transform parameters which map the training image to the alignment model image.

34. In an artificial vision system, a system for statistical training of the system on an object comprising:
an imaging system for iteratively imaging an object to generate a plurality of training images;
an alignment unit for determining the affine pose of each training image with respect to an alignment model image selected from one of the plurality of training samples, wherein said affine pose comprises parameters defining said object's orientation with at least four degrees of freedom;
a filter for prefiltering each training image using a filter that reduces errors introduced by a subsequent affine transformation to generate filtered images;
an affine transform for transforming each of the filtered images with the corresponding affine pose to generate a plurality of transformed images;
means for computing a template image and threshold image of the object from the plurality of transformed images; and
means for comparing the alignment model with a run-time image of the object to align the run-time image with the template.

35. The system of claim 34 wherein the alignment model image is generated from a geometric model of the object.

36. The system of claim 34 wherein the alignment model image is selected form one of the training images.

37. The system of claim 34 further comprising a template image accumulator and a threshold image accumulator for computing a single template representation of the object.

38. The system of claim 34 wherein, during run-time, the imaging system further images a run-time object to generate a run-time image, the system further comprising
a run-time alignment unit for determining the affine pose of the run-time image with respect to the alignment model image;
a run-time filter for prefiltering the run-time image to generate a filtered run-time image;

a run-time affine transform for transforming the filtered run-time image with the affine pose of the run-time image to generate a transformed run-time image;

a mean-corrector for correcting the transformed run-time image with the template image to provide a mean-corrected image;

a comparator for comparing the mean-corrected image with the threshold image to produce an error image;

an analyzer for analyzing the error image to determine object status.

* * * * *